United States Patent Office 3,273,547
Patented Sept. 20, 1966

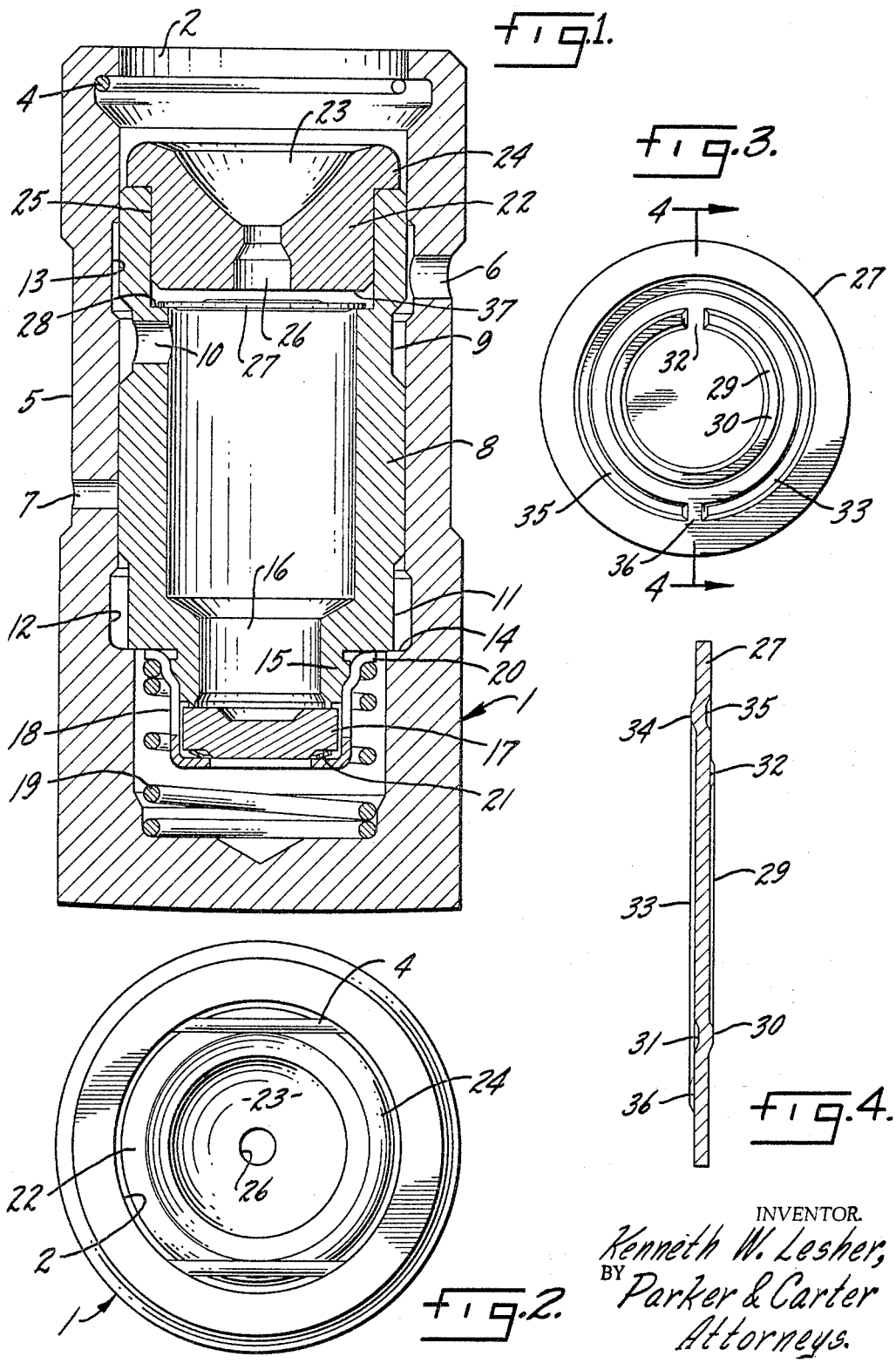

3,273,547
HYDRAULIC TAPPET WITH METERING MEANS
Kenneth W. Lesher, Wheaton, Ill., assignor to Standard Screw Company, Bellwood, Ill., a corporation of Illinois
Filed Jan. 12, 1965, Ser. No. 424,901
10 Claims. (Cl. 123—90)

This invention relates to improvements in hydraulic tappets. It has for one object to provide in a hydraulic tappet means for metering the flow of fluid in the direction of the push rod.

Another object is to provide in connection with a device of the type indicated metering means of such construction that they cannot be improperly assembled.

Another object is to provide in a hydraulic tappet means for metering the flow of fluid in the direction of the push rod. The metering means itself including a member so shaped that it cannot be improperly assembled in the tappet.

Other objects and advantages of the invention will appear in the following description and claims.

The invention is illustrated more or less diagrammatically in the following drawings wherein:

FIGURE 1 is a longitudinal section of a hydraulic tappet illustrating the means for preventing pump-up and also illustrating the cooperating metering means;

FIGURE 2 is an end elevation of the tappet of FIGURE 1;

FIGURE 3 is a plan view of one form of the metering member on an enlarged scale, and FIGURE 4 is a transverse section taken at line 4—4 of FIGURE 3 on a further enlarged scale.

The device in the particular form shown herewith illustrated comprises a cylinder 1 having an open end 2 grooved inwardly to receive a snap ring 4 to retain a plunger within the cylinder. The cylinder is provided externally with an oil groove 5 and with an oil supply passage 6 from within its wall and within the area defined by the oil groove. The cylinder 1 is also provided with a port or passage 7 which may connect the interior of the cylinder with the oil groove 5.

Positioned within the cylinder for reciprocation therein is a plunger 8 which is provided on its exterior with an oil groove 9. A perforation 10 connects the interior of the plunger 8 with the oil groove 9 and provides a passageway for the passage of oil into the plunger. The plunger is reduced exteriorly as at 11. The bore of the cylinder may be enlarged if desired intermediate its ends, as at 12, and it may also be enlarged toward its open end, as at 13. A shoulder 14 may be provided within the cylinder to limit the inward movement of the plunger.

The plunger is reduced to a necklike proportion 15 adjacent its inner end and an opening 16 is formed in this reduced portion. A valve 17 is positioned adjacent the open end 16 and is held against separation from the plunger by a retainer 18 which fits about the reduced portion 15 and is retained therein. The cage or retainer 18 is shaped to permit movement of the valve 17 toward or away from the plunger but to prevent its total separation therefrom.

A spring 19 bears at one end against the closed end of the cylinder 1 and at the other end against the shoulder 20 formed by the lip portion of the retainer 18.

A spring 21 may, if desired, be positioned in contact with the valve 17 and also in contact with the inwardly turned flange of the retainer. In some cases the spring 21 will be omitted.

In its open end, the plunger 8 receives a cuplike member 22 which has a generally rounded and more or less hemispherical cavity 23 in its open end. The member 22 has a shouldered portion 24 which limits the movement of its reduced portion into the plunger. A perforation or passage 23 is formed in the member 22 and provides an oil passage communicating with the interior of the plunger.

A metering disc 27 is positioned within the space defined by the inner end of the portion 25 of the cup member and the shoulder 28 formed in the plunger 8. The space defined between these members is sufficiently large to permit reciprocation of the metering disc 27. The diameter of the disc is less than the diameter of the space within which it is positioned. Thus, clearance for the flow of oil is provided about the edge of the metering disc.

The metering disc is shown in FIGURES 3 and 4 separately from the tappet assembly on an enlarged scale. As there shown, the disc comprises generally a disc member having a circular plan. On each face of the disc there is formed a C ring. As shown particularly in FIGURE 3, these rings face oppositely and each provides a raised portion or land and a depressed or groovelike portion.

As shown particularly in FIGURE 4, the inner C ring 29 is shaped to provide a generally flat area 30 and a groovelike portion 31. An opening 32 is formed in the C ring. The outer or larger C ring 33 is formed on the opposite face of the disc 27 and it includes a raised portion or land 34, a grooved or hollow portion 35 and an opening 36 between its adjacent ends.

Thus, each of the C rings provides a raised land 30 or 34 and these lands are positioned on opposite faces of the disc 27 making it impossible to assemble the metering disc in an improper position. However it may be installed into the tappet in the position shown in FIGURE 1, one of the C rings will face the inner flat surface of the cup member 22. Since each of the C rings is of greater diameter than the innermost end of the passage 26, the disc, when either of its C rings is seated against the surface 37, will meter the flow of oil from the interior of the plunger to the push rod receiving depression 23. The notches or openings 32 and 36 have the same area in each case. Hence, whichever face of the disc 27 is opposed to the surface 37, a metering opening of the same capacity will be created by the seating of the raised lands 30 or 34 upon the plane surface 37 of the cup member 22. Obviously only one of the C rings is effective at a time. The one which faces the interior of the plunger chamber has no metering effect. It is only the one which faces the cup member 22 and can be seated upon it which has any metering effect.

The sole purpose of the provision of two oppositely facing C rings or grooves upon a single disc is to make sure that one C ring or groove will always be in suitable position for metering when brought into contact with the mating face of the cup member irrespective of the manner of assembly of the metering disc in the suitable cavity within the plunger assembly.

The use, operation and function of the invention are as follows:

During the operation of this tappet, oil moves continuously from the chamber within the plunger to the cuplike portion of the member 22 to reach the end of the push rod which is positioned within the cup and to move through the push rod to lubricate the rocker arm and associated parts. It is generally preferable to meter the oil passing into the cup from the plunger and this is accomplished by the use of the metering disc 27 which is mounted to move into contact and out of contact with respect to the face 37 of the cup member 22. It is moved by pressure within the chamber formed inside of the plunger. When pressure conditions within the plunger move the disc 27 to seat one or the other of the C rings 29 or 33 upon the surface 37, oil can pass into the passage 26 only by first passing through the opening 32 or 36 of the respective C ring 29 or 33, whichever may be in contact with the surface 37.

As shown in FIGURE 1, the disc is out of contact with the face 37. It is seated on the shoulder 28 and oil flow to the passage 26 is not taking place. When the movement of the plunger is such that the disc is unseated from the shoulder 28, liquid may pass about the edges of the disc toward the passage 26 and as the land portion of one or another of the C rings is seated on the surface 37, the land portion prevents flow to the passage 26 except through the openings 32 or 36. Since these are of identical size, the same amount of oil is passed to the passage 26 whether the C ring 29 or 33 is in place.

In general the operation of the tappet, except for respect to the metering, is that typical of hydraulic tappets.

Whereas the preferred form of the invention has been shown and described herein, it should be realized that there are many modifications, substitutions and alterations thereto within the scope of the following claims.

I claim:

1. A metering valve for a tappet having a hollow open ended cylinder, a hollow plunger mounted for reciprocation therein, a passage formed in the cylinder wall and in the plunger wall through which oil may reach the interior of the plunger, a pressure chamber defined within the cylinder and between it and the plunger, a closure for said plunger, a passage through said closure, said value comprising means within the plunger for metering flow through said closure passage comprising a disklike member, a plurality of raised portions formed one on each face of said member, each comprising a wall-like member having adjacent ends approaching but separated from each other, the area of separation of the ends of each pair of wall-like members being identical, and a surface formed on said closure within said plunger against which the adjacent wall-like member is adapted to be seated in response to pressure within the plunger, said wall-like members being so disposed on said first-mentioned member as to surround the opening to said closure passage regardless of which of said wall-like members faces said seating surface.

2. A metering valve for a tappet having a hollow open ended cylinder, a hollow plunger mounted for reciprocation therein, yielding means mounted within the cylinder in contact with the plunger and biased to move the latter toward the open end of the cylinder, a passage formed in the cylinder wall and in the plunger wall through which oil may reach the interior of the plunger, a pressure chamber defined with the cylinder and between it and the plunger, a closure for said plunger, a passage through said closure, said valve comprising means within the plunger for metering flow through said closure passage comprising a disklike member, a plurality of raised portions formed one on each face of said disklike member, each comprising a wall-like member having adjacent ends approaching but separated from each other, the area of separation of the ends of each pair of wall-like members being identical, and a surface formed on said closure within said plunger against which the adjacent wall-like member is adapted to be seated in response to pressure within the plunger, said wall-like members being so disposed on said first-mentioned member as to surround the opening to said closure passage regardless of which of said wall-like members faces said seating surface.

3. A metering valve for a tappet having a hollow open ended cylinder, a hollow plunger mounted for reciprocation therein, yielding means mounted within the cylinder in contact with the plunger and biased to move the latter toward the open end of the cylinder, a passage formed in the cylinder wall and in the plunger wall through which oil may reach the interior of the plunger, a pressure chamber defined within the cylinder and between it and the plunger, a closure for said plunger shaped to receive a push rod, a passage through said closure communicating with said push rod receiving portion, said valve comprising means within the plunger for metering flow through said closure passage comprising a disklike member, a plurality of raised portions formed one on each face of said member each comprising a wall-like member having adjacent ends approaching but separated from each other, the area of separation of the ends of each pair of wall-like members being identical, and a surface formed on said closure within said plunger against which the adjacent wall-like member is adapted to be seated in response to pressure within the plunger, said wall-like members being so disposed on said first-mentioned member as to surround the opening to said closure passage regardless of which of said wall-like members faces said seating surface.

4. A metering valve for a tappet having a hollow open ended cylinder, a hollow plunger mounted for reciprocation therein, yielding means mounted within the cylinder in contact with the plunger and biased to move the latter toward the open end of the cylinder, a passage formed in the cylinder wall and in the plunger wall through which oil may reach the interior of the plunger, a pressure chamber defined within the cylinder and between it and the plunger, a closure of said plunger, a passage through said closure, said valve comprising means within the plunger for metering flow through said closure passage comprising a disklike member, a plurality of raised portions formed one on each face of said member, each comprising a wall-like member having adjacent ends approaching but separated from each other, the area of separation of the ends of each pair of wall-like members being identical, and a surface formed on said closure within said plunger against which the adjacent wall-like member is adapted to be seated in response to pressure within the plunger, said wall-like members being so disposed on said first-mentioned member as to surround the opening to said closure passage regardless of which of said wall-like members faces said seating surface.

5. A metering valve for a tappet having a hollow open ended cylinder, a hollow plunger mounted for reciprocation therein, yielding means mounted within the cylinder in contact with the plunger and biased to move the latter toward the open end of the cylinder, a passage formed in the cylinder wall and in the plunger wall through which oil may reach the interior of the plunger, a pressure chamber defined within the cylinder and between it and the plunger, a closure for said plunger, a passage through said closure, said valve comprising means within the plunger for metering flow through said closure passage comprising a disklike member, a plurality of raised portions formed one on each face of said disklike member each comprising a curved wall-like member having adjacent ends approaching but separated from each other, the area of separation of the ends of each pair of wall-like members being identical, and a surface formed on said closure within said plunger against which the adjacent wall-like member is adapted to be seated in response to pressure within the plunger, said wall-like members being so disposed on said first-mentioned member as to surround the opening to said closure passage regardless of which of said wall-like members faces said seating surface.

6. A metering valve for a tappet having a hollow open ended cylinder, a hollow plunger mounted for reciprocation therein, yielding means mounted within the cylinder in contact with the plunger and biased to move the latter toward the open end of the cylinder, a passage formed in the cylinder wall and in the plunger wall through which oil may reach the interior of the plunger, a pressure chamber defined within the cylinder and between it and the plunger, a closure for said plunger, a passage through said closure, said valve comprising means within the plunger for metering the flow through said closure passage comprising a flat member, a plurality of raised portions formed one on each face of said member, each comprising a wall-like member having adjacent ends approaching but separated from each other, the area of separation of the ends of each pair of wall-like members being identical, and a plane surface formed on said closure within said plunger against which the adjacent wall-like member is adapted to be seated in response to pressure within the plunger, said wall-like members being so disposed on said first-mentioned member as to surround the opening to said closure passage regardless of which of said wall-like members faces said seating surface.

7. A metering valve for a tappet having a hollow open ended cylinder, a hollow plunger mounted for reciprocation therein, yielding means mounted within the cylinder in contact with the plunger and biased to move the latter toward the open end of the cylinder, a passage formed in the cylinder wall and in the plunger wall through which oil may reach the interior of the plunger, a pressure chamber defined within the cylinder and between it and the plunger, a closure for said plunger, a passage through said closure, said valve comprising means within the plunger for metering flow through the closure passage comprising a flat disklike member, a plurality of raised portions formed one on each face of said disklike member, each comprising a wall-like member having adjacent ends approaching but separated from each other, the area of separation of the ends of each pair of wall-like members being identical, and a plane surface formed on said closure within said plunger against which the adjacent wall-like member is adapted to be seated in response to pressure within the plunger, said wall-like members being so disposed on said first-mentioned member as to surround the opening to said closure passage regardless of which of said wall-like members faces said seating surface.

8. A metering valve for a tappet having a hollow open ended cylinder, a hollow plunger mounted for reciprocation therein, yielding means mounted within the cylinder in contact with the plunger and biased to move the latter toward the open end of the cylinder, a passage formed in the cylinder wall and in the plunger wall through which oil may reach the interior of the plunger, a pressure chamber defined within the cylinder and between it and the plunger, a closure for said plunger, a passage through said closure, said valve comprising means within the plunger for metering flow through said closure passage comprising a flat disklike member, a plurality of raised portions formed one on each face of said disklike member each comprising a curved wall-like member having adjacent ends approaching but separated from each other, the area of separation of the ends of each pair of wall-like members being identical, and a plane surface formed on said closure within said plunger against which the adjacent wall-like member is adapted to be seated in response to pressure within the plunger, said wall-like members being so disposed on said first-mentioned member as to surround the opening to said closure passage regardless of which of said wall-like members faces said seating surface.

9. A metering valve for a tappet having a hollow open ended cylinder, a hollow plunger mounted for reciprocation therein, yielding means mounted within the cylinder in contact with the plunger and biased to move the latter toward the open end of the cylinder, a passage formed in the cylinder wall and in the plunger wall through which oil may reach the interior of the plunger, a pressure chamber defined within the cylinder and between it and the plunger, a closure for said plunger shaped to receive a push rod, a passage through said closure communicating with said push rod receiving portion, said valve comprising means within the plunger for metering flow through said closure passage comprising a flat member, a plurality of raised portions formed one on each face of said member, each comprising a wall-like member having adjacent ends approaching but separated from each other, the area of separation of the ends of each pair of wall-like members being identical, and a plane surface formed on said closure within said plunger against which the adjacent wall-like member is adapted to be seated in response to pressure within the plunger, said wall-like member being so disposed on said first-mentioned member as to surround the opening to said closure passage regardless of which of said wall-like members faces said seating surface.

10. A metering valve for a tappet having a hollow open ended cylinder, a hollow plunger mounted for reciprocation therein, yielding means mounted within the cylinder in contact with the plunger and biased to move the latter toward the open end of the cylinder, a passage formed in the cylinder wall and in the plunger wall through which oil may reach the interior of the plunger, a pressure chamber defined within the cylinder and between it and the plunger, a closure for said plunger shaped to receive a push rod, a passage through said closure communicating with said push rod receiving portion, said valve comprising means within the plunger for metering flow through said closure passage comprising a flat disklike member, a plurality of raised portions formed one on each face of said disklike member, each comprising a curved wall-like member having adjacent ends approaching but separated from each other, the area of separation of the ends of each pair of wall-like members being identical, and a plane surface formed on said closure within said plunger against which the adjacent wall-like member is adapted to be seated in response to pressure within the plunger, said wall-like members being so disposed on said first-mentioned member as to surround the opening to said closure passage regardless of which of said wall-like members faces said seating surface.

References Cited by the Examiner
UNITED STATES PATENTS

| | | | |
|---|---|---|---|
| 2,807,279 | 9/1957 | Presnell | 137—513.5 |
| 2,818,050 | 12/1957 | Papenguth | 123—90 |
| 2,857,895 | 10/1958 | Scheibe | 123—90 |
| 3,014,472 | 12/1961 | Wisman | 123—90 |
| 3,139,078 | 6/1964 | Van Slooten | 123—90 |
| 3,142,290 | 7/1964 | Lesher | 123—90 |

CARLTON R. CROYLE, *Primary Examiner.*

AL LAWRENCE SMITH, *Examiner.*